(12) United States Patent
Schmidt

(10) Patent No.: US 7,508,995 B2
(45) Date of Patent: Mar. 24, 2009

(54) METHOD AND APPARATUS FOR MONITORING ELECTRONIC TRANSMISSION OF AN IMAGE

(75) Inventor: Wilfried Schmidt, Gössweinstein (DE)

(73) Assignee: Siemens Aktiengesellschaft, Munich (DE)

( * ) Notice: Subject to any disclaimer, the term of this patent is extended or adjusted under 35 U.S.C. 154(b) by 863 days.

(21) Appl. No.: 10/843,998

(22) Filed: May 12, 2004

(65) Prior Publication Data

US 2005/0047634 A1 Mar. 3, 2005

(30) Foreign Application Priority Data

May 12, 2003 (DE) ................. 103 21 236

(51) Int. Cl.
*G06K 9/00* (2006.01)
*G06K 9/36* (2006.01)
*H04N 5/225* (2006.01)
*H04N 11/14* (2006.01)
*G06F 3/038* (2006.01)

(52) U.S. Cl. ............ 382/276; 382/100; 348/207.99; 348/493; 345/557; 345/204

(58) Field of Classification Search ......... 348/460, 348/461–468, 207.99, 211.9, 488–493; 378/98, 378/98.11, 98.12; 345/530–535, 557, 204; 345/690–691, 208–210; 382/100, 103, 128–132, 382/276, 284

See application file for complete search history.

(56) References Cited

U.S. PATENT DOCUMENTS

| | | | | |
|---|---|---|---|---|
| 3,875,329 A | * | 4/1975 | Nagel | 348/463 |
| 3,988,579 A | * | 10/1976 | Bottard et al. | 714/25 |
| 4,458,267 A | * | 7/1984 | Dolazza | 378/98.7 |
| 4,858,224 A | * | 8/1989 | Nakano et al. | 370/217 |
| 4,888,795 A | * | 12/1989 | Ando et al. | 348/14.14 |
| 5,056,524 A | * | 10/1991 | Oe | 600/431 |
| 5,319,735 A | * | 6/1994 | Preuss et al. | 704/205 |
| 5,644,613 A | * | 7/1997 | Mick | 378/98.12 |
| 5,875,249 A | | 2/1999 | Mintzer et al. | |
| 6,304,774 B1 | * | 10/2001 | Gorman | 600/520 |
| 6,512,837 B1 | | 1/2003 | Ahmed | |
| 6,539,503 B1 | * | 3/2003 | Walker | 714/703 |
| 6,633,329 B2 | * | 10/2003 | Janko et al. | 348/180 |
| 6,801,249 B1 | * | 10/2004 | Gobbo | 348/208.14 |
| 6,886,116 B1 | * | 4/2005 | MacLellan et al. | 714/703 |
| 7,002,637 B2 | * | 2/2006 | Szybiak et al. | 348/700 |
| 7,280,696 B2 | * | 10/2007 | Zakrzewski et al. | 382/218 |
| 2003/0076370 A1 | * | 4/2003 | Hahn | 345/961 |

FOREIGN PATENT DOCUMENTS

EP 0 573 648 6/1999

\* cited by examiner

*Primary Examiner*—Matthew C Bella
*Assistant Examiner*—Manav Seth
(74) *Attorney, Agent, or Firm*—Schiff Hardin LLP

(57) ABSTRACT

In a monitoring method and image processing apparatus for monitoring electronic transmission of an image, an image detector supplies an input image to a processing circuit that caches it in an image storage. The cached image, or an image derived therefrom, is forwarded as an output image to a viewing device, which outputs the image to a viewer. To monitor the image transfer, an insertion circuit upstream from the processing circuit inserts a dynamic input test signal into the input image. A test circuit downstream from the processing circuit tests whether the output image contains a dynamic output test signal corresponding with the input test signal. Given the absence of the dynamic output test signal, alarm notification is provided to the viewer.

34 Claims, 4 Drawing Sheets

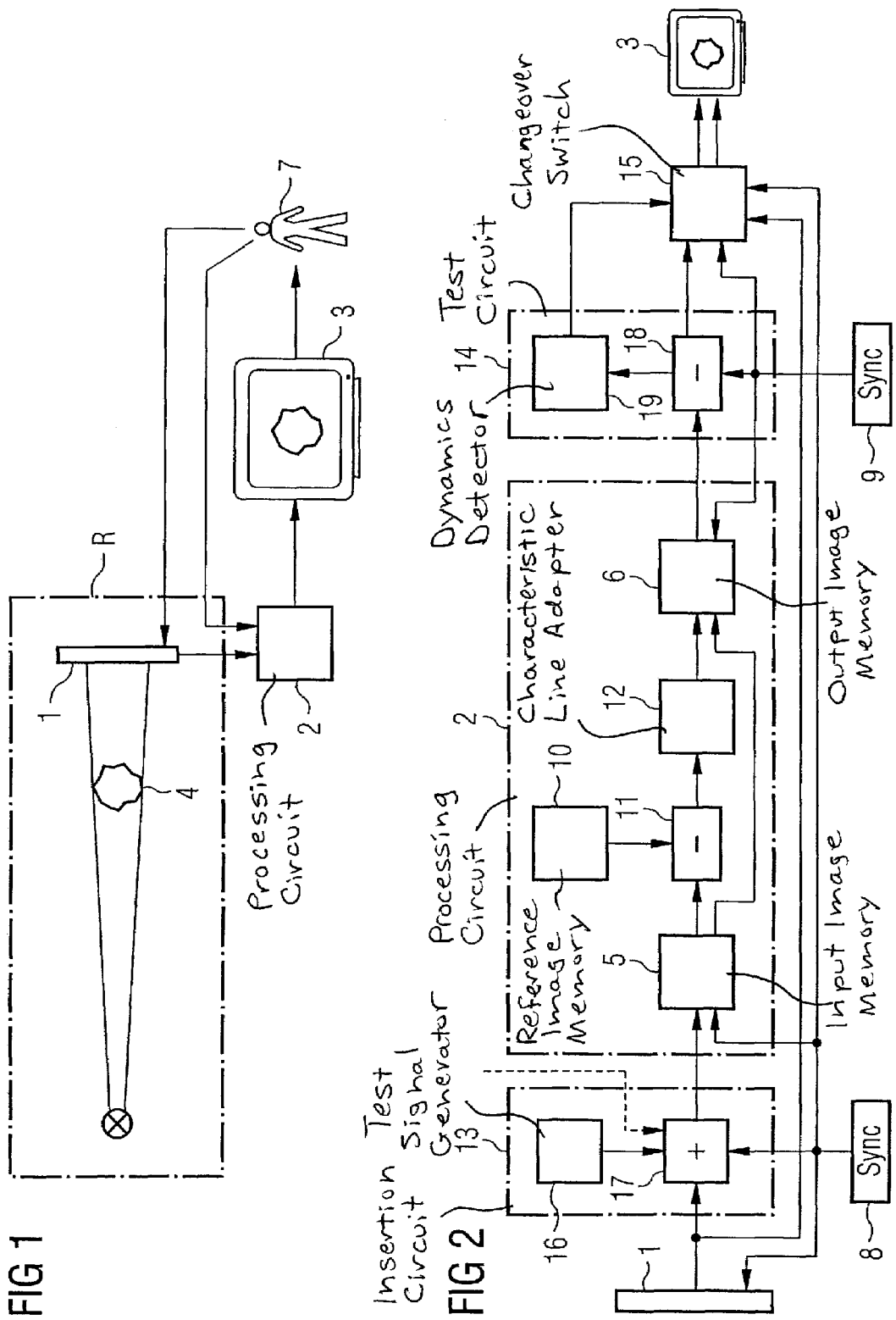

METHOD AND APPARATUS FOR MONITORING ELECTRONIC TRANSMISSION OF AN IMAGE

BACKGROUND OF THE INVENTION

1. Field of the Invention

The present invention concerns a method for monitoring electronic transmission of an image, of the type wherein an source image is supplied from an image detector to a processing circuit, the input image is cached (buffered) in an image storage within the processing circuit, and the cached image, or an image derived by the processing circuit using the cached image, is conveyed as an output image to a viewing device at which it is displayed. The present invention furthermore concerns an image processing apparatus to implement such a method, with a processing circuit with an image memory, an image detector upstream from the processing circuit, and a viewing device downstream from the processing circuit.

2. Description of the Prior Art

Monitoring methods and image processing apparatuses of the above type are generally known. They are used, for example, in medical image processing in the framework of a technique known as the road map method.

In the road map method, the it source image is generated in the image detector, normally from x-ray radiation. Suitable synchronization signals (hsync and vsync) are then added to the source image, and a video signal this is generated. The video signal is supplied to the image processing circuit and cached there in an input image memory.

In the processing circuit, a reference image can be subtracted from the cached image. The reference image normally is an image of the presently imaged subject that was acquired at an earlier point in time. Changes thus can be made more clear by the formation of a difference image. In particular, a catheter and/or contrast fluid can be shown significantly more clearly than would be possible with only the input image.

An output image is determined using the cached image or the difference image determined by subtraction of the reference image. The output image is forwarded to the viewing device and presented thereat to the viewer.

It is possible that the storage of the source image in the input image memory may not take place due to interferences of the synchronization signals or other causes, for example a partial failure of the processing circuit. In this event, a static image is presented as the output image, namely the last stored input image, or the (possibly processed) difference of the last stored input image and the reference image. The viewer thus sees on the viewing device a static, outdated image, although the source image itself has already changed. The reason for this is that the storage of the new input image in the buffer has stopped.

SUMMARY OF THE INVENTION

An object of the present invention is to provide a monitoring method in which such missing functions in the storage of the source image are recognizable as such with reliability by the viewer.

The object is achieved in a monitoring method of the type initially described, but wherein a dynamic input test signal is inserted into the source image by an insertion circuit upstream from the processing circuit, and it is tested by a test circuit downstream from the processing circuit as to whether the output image contains a dynamic output test signal corresponding with the input test signal, and an alarm notification, different from the output test signal is output to the viewer by the test circuit if the dynamic output test signal.

Testing whether the dynamic output test signal differs from the dynamic input test signal encompasses testing whether the dynamic output test signal is present at all, i.e., whether it is absent from the output image.

The object also is achieved by an insertion circuit that implements such a monitoring method that is fashioned as an assembly module for an image processing apparatus, in particular as a plug-in card.

The above object also is achieved by an image processing apparatus to implement such a method, in which an insertion circuit is connected between the image detector and the processing circuit and a test circuit is connected between the processing circuit and the viewing device.

The monitoring method operates particularly reliably when the input test signal is generated by the insertion circuit, but it is also possible for the input test signal to be supplied to the insertion circuit from the outside.

The input test signal itself can be of an arbitrary nature as long as the actual input image is not, or is at least only insignificantly, affected, and the absence of the dynamic output test signal is can be recognized in good time. A simple possibility to insert an input test signal (which does not or only insignificantly affects the input image) is to insert the input test signal into the area of the image edge in the input image.

In one embodiment the alarm notification is that the viewing device discontinues display of the output image, this prevents the viewer from ignoring the alarm notification. The alarm notification can further involve a direct through-switching of the source image supplied by the image detector to the viewing device, so that an unprocessed, but at least current, image is supplied to the viewer, as a replacement.

As an alternative or in addition to the output image, or the use of the input image supplied by the image detector, a predetermined, in particular static alarm notice also can be output. For example, a notification having the content "Warning—no current image" can be output continuously or blinking at the viewing device.

In an embodiment wherein the insertion circuit and the test circuit mutually monitor each other, and given detection of an error function of one of these circuits by the other circuit, a warning notification is output to the viewer by the other circuit, so the monitoring method operates even more securely. In particular in this case a relatively uncritical error can be detected in the insertion or test circuit before it can lead to a critical non-detection of the absence of the dynamic output test signal.

In a further embodiment in the event of error, the function of the circuit that is detected as malfunctioning is taken over by the other circuit. This allows the monitoring method to be continued for a limited time—for example, until the end of an already running examination—since the probability of a second error in the remaining examination time is relatively low.

DESCRIPTION OF THE DRAWINGS

FIG. 1 is an overview of an x-ray system and an image processing apparatus, constructed and operating in accordance with the invention.

FIG. 2 is a block diagram of the image processing apparatus from FIG. 1.

DESCRIPTION OF THE PREFERRED EMBODIMENTS

Figure 3:
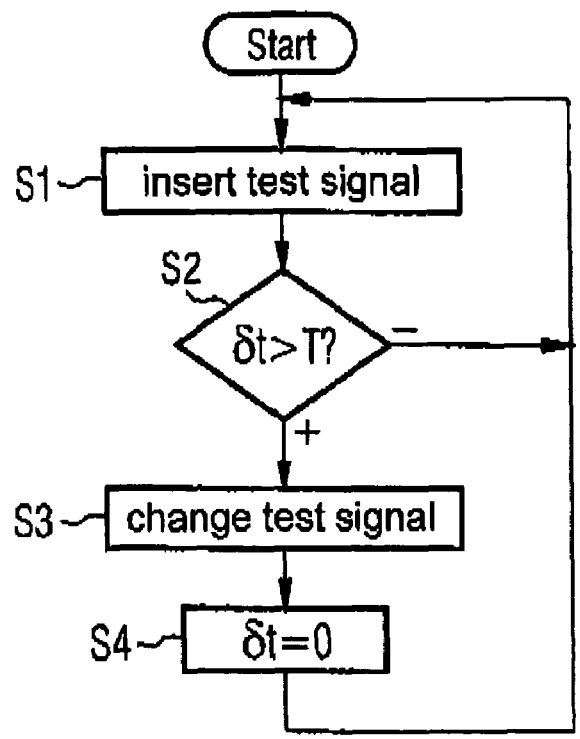
FIG. 3 is a flow chart of the inventive method.

According to FIGS. 1 and 2, an image processing apparatus has an image detector 1, a processing circuit 2 and a viewing device 3. The viewing device 3, for example, can be a standard monitor or a flat-panel display (TFT display).

In the image detector 1, an image of a subject is obtained by x-ray irradiation with an x-ray system R. The source image is supplied from the image detector 1 to the processing circuit 2. There—see in particular FIG. 2—the image is cached in an input image memory 5. Processing of the cached image (described in more detail below) ensues within the processing circuit 2. As a result of this processing, in the output image memory 6 an output image is stored that corresponds with the cached image, or that has been generated using the cached image. The output image is conveyed to the viewing device 3 and presented thereat to a viewer 7.

Control commands can be entered by the user 7 into the x-ray system R and into the processing circuit 2. Corresponding to the control commands, for example, the x-ray system R is rotated around the subject 4, or it is determined whether the image stored in the input image memory 5 is or is not directly connected through to the output image memory 6.

As shown in FIG. 2, in addition to the image detector 1, the processing circuit 2 and the viewing device 3, the image processing apparatus has an input-side synchronization signal generator 8 and an output-side synchronization signal generator 9.

The input-side synchronization signal generator 8 provides horizontal and vertical synchronization signals to the image detector 1, possibly also to the input image memory 5. The read-in of the source image supplied by the image detector 1 into the input image memory 5 is controlled using the synchronization signals of the input-side synchronization signal generator 8.

In an analogous manner, the output-side synchronization signal generator 9 provides horizontal and vertical synchronization signals to the output image memory 6, possibly also to the viewing device 3. The readout of the output image from the output image memory 6 is controlled using these synchronization signals.

As already mentioned, upon entry of appropriate control signals by the viewer 7, it is possible to accept the input image stored in the input image memory 5 directly into the output image memory 6, but processing of the input image in advance normally ensues. Generally, as a rule the input image and a reference image stored in a reference image memory 10 are supplied within the processing circuit 2 to a subtractor 11. The subtractor 11 subtracts the reference image from the input image and thus generates a difference image. The difference image is then written into the output image memory 6 via a characteristic line adapter 12. In this case, the output image is thus not directly determined from the input image by itself, but rather using the difference image.

The reference image is normally an image of the same subject that is also currently acquired by the image detector 1, but acquired at an earlier point in time—for example before the beginning of a medical intervention—and written into the reference image memory 10. The difference image therefore shows very clearly the changes that have taken place in the intervening time.

The read-in of the input image into the input image storage 5 and the readout of the output image from the output image storage 6 ensue independent of one another. It is therefore possible that—for example due to interferences in the synchronization signals emitted by the input-side synchronization signal generator 8—the source image is no longer fed to the source image memory 5. This cannot be detected without assistance by the viewer 7 of the output image. It also is possible that the source image has not actually changed.

In order to be able to detect a such a falsely static output image, i.e., the presentation of an output image that is no longer current, the image processing apparatus has an insertion circuit 13, a test circuit 14 and a changeover switch 15. These components 13, 14 and 15 accomplish the inventive monitoring method by means of which it can be detected whether the output image is still dynamic, i.e., whether the current source image or an output image derived therefrom has been transmitted to the viewing device 3.

The insertion circuit 13 is connected between the image detector 1 and the processing circuit 2, and includes a test signal generator 16 and a mixer 17.

The source image is first supplied to a mixer 17 and the input test signal synchronization signals are supplied from the input-side synchronization signal generator 8. Alternatively, the synchronization signals can be added to the source image, in which case a new feed is not necessary.

A dynamic input test signal also is supplied to the mixer 17 by the test signal generator 16. The input test signal is inserted by the mixer 17 into the source image at a predetermined location of the source image. This is explained in detail below in connection with FIGS. 3 and 4.

As shown in FIG. 3, the input test signal is inserted into the source image in step S1. In step S2, it is tested whether an elapsed time δt has exceeded a time limit T. If the time limit T has not yet been exceeded, the process jumps back to step S1. If the time limit T has been exceeded, in steps S3 and S4 the input test signal is changed and the elapsed time δt is reset.

The input test signal can be of an arbitrary nature as long as it is sufficiently dynamic. For example, a counter reading of a counter that counts up each second can be inserted into the source image in digital form. Alternatively or additionally, an intrinsically constant marking can also, for example, be displaced within a predetermined line of the source image. Another alternative is for intrinsically constant marking to be alternately inserted and not inserted in the source image.

The generation and insertion of the input test signal in the source image can ensue via the test signal generator 16 and the mixer 17 in the same manner that is generally known for the generation and mixing of an on-screen display for computer and television devices. Detailed explanations to assemble and to fashion the test signal generator 16 and the mixer 17 therefore are not necessary.

According to the exemplary embodiment of FIG. 2, the input test signal is itself generated by the insertion circuit 13. This is preferable but not necessary. Alternatively, it is possible (as indicated dashed in FIG. 2) to supply the input test signal to the insertion circuit 13 from outside.

The insertion of the input test signal must ensue in such a way that the actual source image—and thus the output image—is not disturbed. The input test signal is therefore preferably is inserted—see FIG. 4—into the source image by the insertion circuit 13 in the area of the image edge. For example, the input test signal can be inserted into the source image in the area of the upper 5% or in the area of the lower 5% of the source image. Such an insertion does not normally interfere. Generally, all lines of the source image or of the corresponding output image are not shown on the viewing device 3. The input test signal thus can be inserted into the input image in the region border or known as the frame. In this case, it is not perceived at all by the viewer 7. The input test signal alternatively can be located in the visible region of the source image. Generally, however, the information content of the source image at the edges is uninteresting for the viewer 7. Also in this case, the input test signal thus does not interfere with the detection of the relevant information content of the source image or of the output image determined therefrom.

The inventive (forced-dynamic) image is output from the insertion circuit 13 to the input image memory 5 and stored therein as input image. The output image is then determined using the stored input image and is stored in the output image memory 6. The input test signal possibly may be changed, but it is neither shifted nor deleted. A corresponding output test signal is thus attained in the output image.

The test circuit 14 is connected between the processing circuit 2 and the viewing device 3. It has an extractor 18 and a dynamics detector 19. The changeover switch 15 is downstream from the test circuit 14, fashioned as an error-protected changeover switch.

The output image is supplied to the extractor 18 from the output memory storage 6 and its is supplied from the output-side synchronization signal generator 9. Here as well a new feed of the synchronization signals is not necessary if they have already been added to the output image. The extractor 18 first outputs the output image—with or without the output test signal—to the changeover switch 15. It is output from this to the viewing device 3.

The extractor 19 also extracts the output test signal from the output image. This is possible because the input test signal possibly may be changed but is neither shifted nor deleted. When, for example, the input test signal was thus inserted by the insertion circuit 13 into the third or tenth image line of the source image, the third or tenth image line of the output image can be detected by the extractor 18 using the synchronization signals and supplied to the dynamics detector 19. The supplied signal then can be evaluated by this. This is explained in detail below in connection with FIG. 5.

Figure 5:
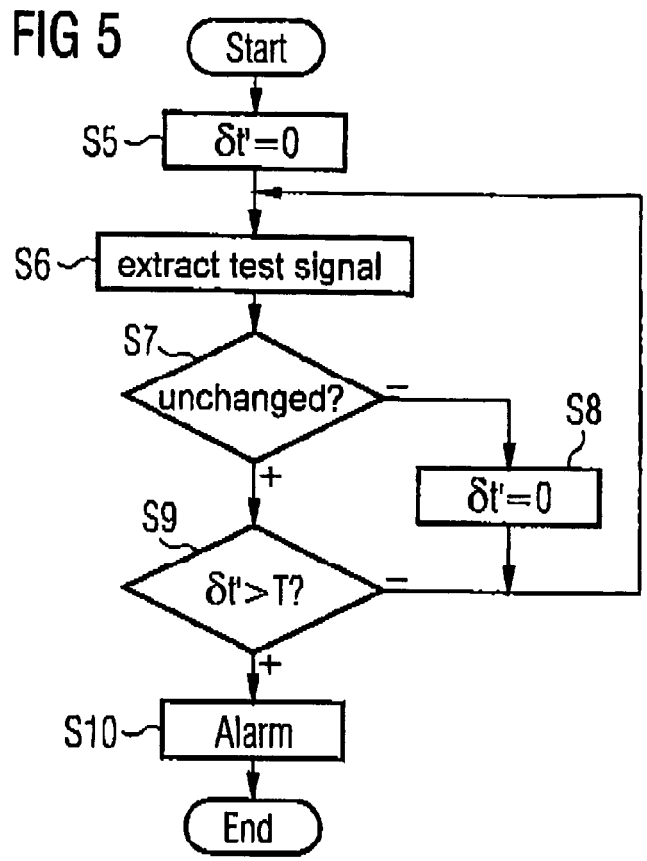
FIG. 5 is a flow chart for the insertion of the input test signal in accordance with the invention.

As shown in FIG. 5, within the test circuit 14 an elapsed time δt' is first reset in step S5. The output test signal is then extracted from the output image in step S6. In step S7 it is checked whether the output test signal has remained unchanged. If this is not the case, the output test signal is dynamic; the image transmission is thus current. In this case, the elapsed time δt' is reset in step S8 and the process jumps back to step S6.

If the extracted output test signal has remained unchanged, it is tested in a step S9 whether the elapsed time δt' has exceeded the time limit T. As long as this is not the case, the process jumps back to step S6. In any other case an alarm reaction is executed in a step S10.

The test circuit 14 thus tests whether a dynamic output test signal corresponding with the input test signal has been added to the output image. It is tested whether an output test signal is present at all, as well as whether the output test signal, if present, is of a dynamic nature. When the output test signal is completely absent or is not dynamic, the alarm reaction (step S10) is executed by the test circuit 14.

Figure 4:
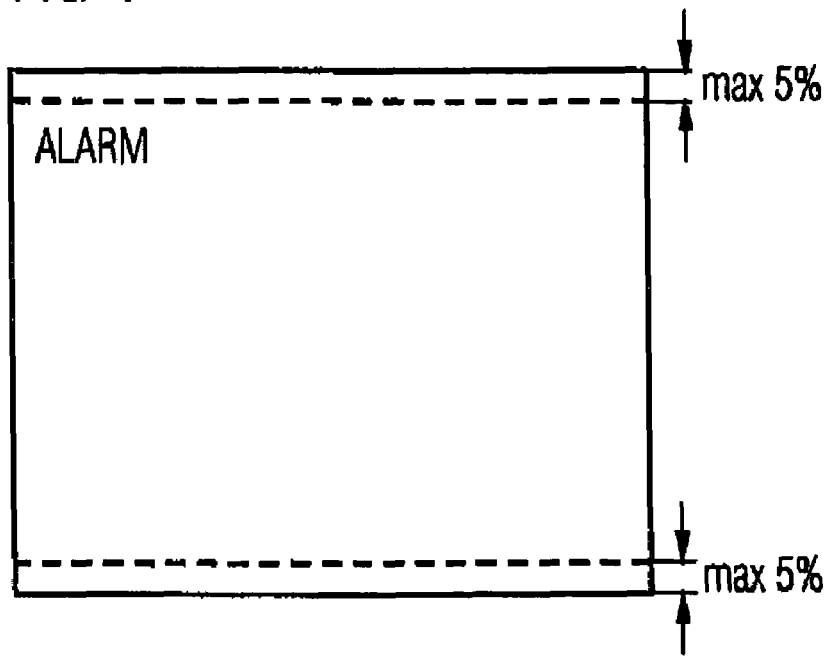
FIG. 4 is an example of an image presented at the display in accordance with the invention.

In the simplest case, the alarm reaction of step S10 is the output of a predetermined acoustic and/or optical alarm signal. For example, an alarm bell can be triggered, or an alarm light can be illuminated (continuously or blinking). It is also possible to output an alarm message, as shown in FIG. 4.

Preferably, however, the changeover switch 15 is triggered by the test circuit 14. For this, the source image itself and the input-side synchronization signals are also supplied from the image detector 1 to the changeover switch 15. It is then possible for the test circuit 14 to trigger the changeover switch 15 upon the absence of the dynamic output test signal. Display of the output image is thereby disconnected by the viewing device 3. Furthermore, the source image supplied by the image detector 1 is sent directly through to the viewing device 3. The viewer 7 thus receives a significantly worse but current image of the subject 4.

As shown in FIG. 2, the insertion circuit 13 and the test circuit 14 are operated independent of one another. In a preferred embodiment explained below in connection with FIG. 6, this is not the case.

Figure 6:
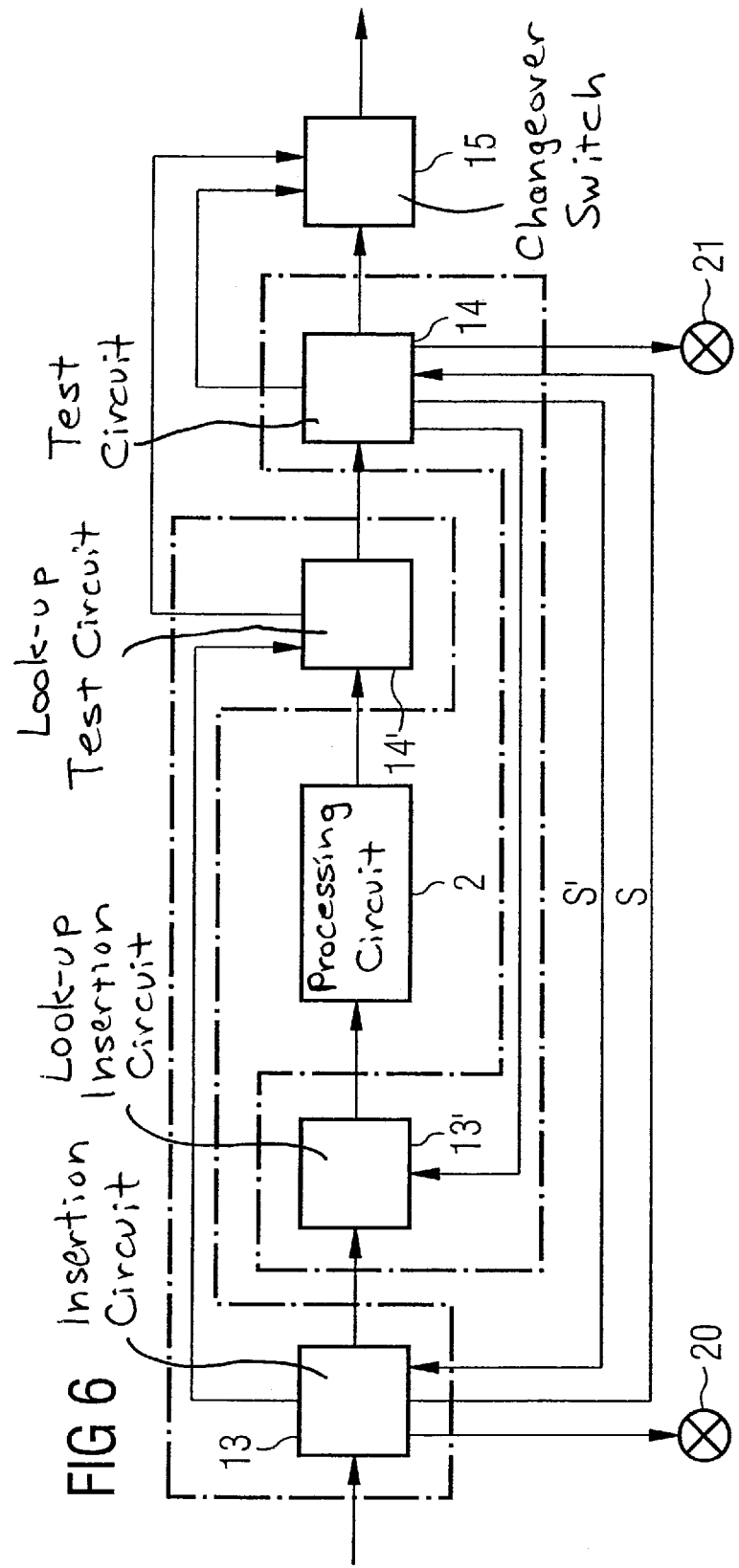
FIG. 6 illustrates an alternative embodiment of the image processing apparatus from FIG. 2.

According to FIG. 6, the insertion circuit 13 transmits a signal S to the test circuit 14 at regular time intervals indicating the insertion circuit 13 is operational. For example, the insertion circuit 13 can have a watchdog circuit, by means of which the insertion circuit 13 first monitors itself. The state of the watchdog circuit is then transmitted to the test circuit 14 as the signal S.

In an analogous manner, a signal S' of the test circuit 14, indicating that it is operational, also can be transmitted to the insertion circuit 13.

The insertion circuit 13 and the test circuit 14 thus are able to monitor each other. If, for example, the insertion circuit 13 detects a malfunction of the test circuit 14, it can—for example via a warning light 20—output a warning notification to the viewer 7. Vice versa, the test circuit 14 can detect a malfunction of the insertion circuit 13 and output a corresponding warning notification to the viewer 7 by triggering a warning light 21.

As shown in FIG. 6, it is possible for a back-up test circuit 14' to be associated with the insertion circuit 13 and a back-up insertion circuit 13' to be associated with the test circuit 14. These back-up circuits 13', 14' normally are inactive. They can be activated as needed by appropriate control signals. It is therefore possible that, in the event of failure, the function of the circuit 14, 13 detected as malfunctioning is taken over by the respective other circuit 13, 14.

As an alternative or in addition to reciprocal monitoring, the insertion circuit 13 and the test circuit 14 can be fashioned as inherently fail-safe circuits.

Figure 7:
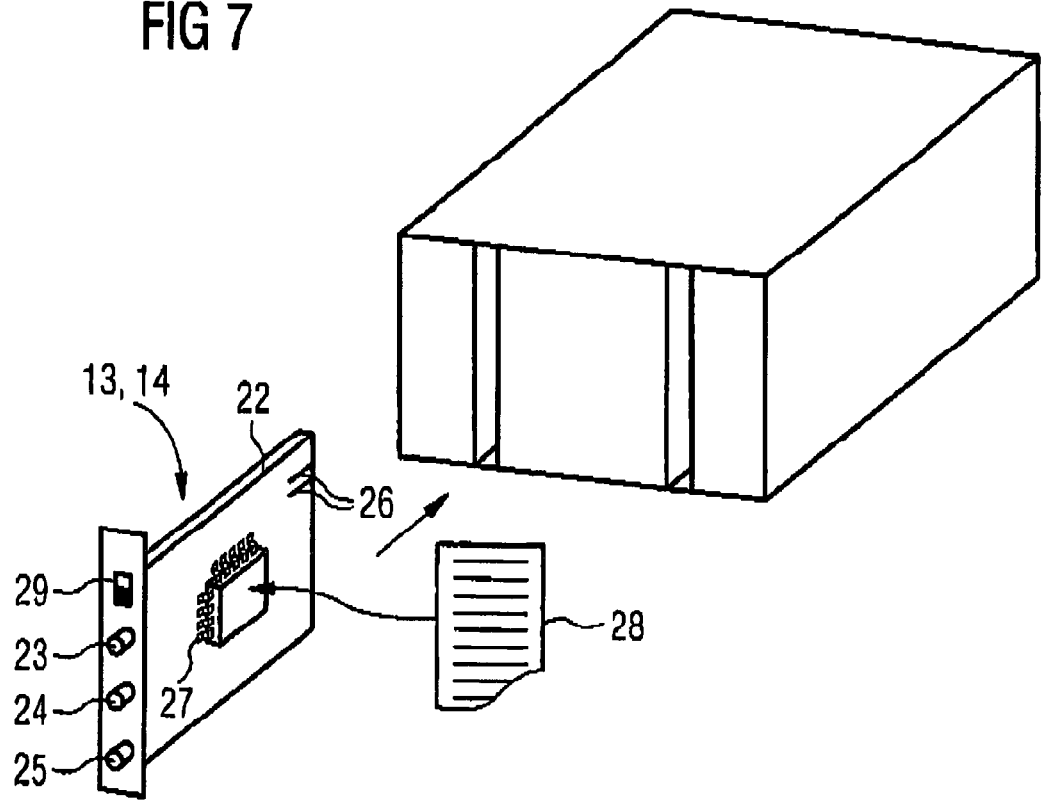
FIG. 7 shows an embodiment of the image processing apparatus from FIG. 2.

As can be seen from FIG. 7, the image processing apparatus can be a modularly designed apparatus. The insertion circuit 13 and the test circuit 14 are fashioned as assembly modules 22 for the image processing apparatus, in particular as plug-in cards 22.

According to FIG. 7, each plug-in card 22 has a video input 23, a video output 24 and a synchronization signal input 25. The video input 23, the video output 24 and the synchronization signal input 25 can be, for example, connections for coaxial cables. Each plug-in card 22 also can have—for example at the rear—connections 26 via which the changeover signal to change over the changeover switch 15 is emitted.

According to FIG. 7, each plug-in card 22 has a data medium 27, for example an EEPROM 27, in particular in the form of a flash EPROM. A computer program 28 that determines the functioning of the respective plug-in card 22 is stored in the data medium 27. Based on the computer program 28, it can be determined, for example, whether the plug-in card 22 acts as an insertion circuit 13 or as a test circuit 14. Since the data carrier 27 preferably is electronically erasable and writable, updates of the computer program 28 are thus possible at any time.

Each plug-in card 22 may further have a switch 29 at the front side. With appropriate programming of the plug-in cards 22 by means of a suitable computer program 28, it can first be determined by the switch setting of the switch 29 whether the plug-in card 22 acts as an insertion circuit 13 or as a test circuit 14.

By means of the inventive monitoring method and the insertion circuit 13 and the test circuit 14, a test is thus possible in a simple manner as to whether the output image always actually reflects the current state of the input image detected by the image detector 1.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for monitoring electronic transmission of an image comprising the steps of:
   electronically inserting a dynamic input test signal into an electronic source image to produce an electronic input image;
   supplying said input image to a processing circuit and, in said processing circuit, caching said input image in an image memory, as a cached image;
   in said processing circuit, generating an output image containing a dynamic output test signal, said output image being selected from the group consisting of said cached image and an image derived from said cached image, and emitting said output image from said processing circuit and displaying said output image;
   testing only said dynamic output test signal contained in said output image emitted from said processing circuit as to whether said dynamic output test signal corresponds to said dynamic input test signal; and
   generating a humanly perceptible notification if said testing indicates non-correspondence between said dynamic output test signal and said dynamic input test signal.

2. A method as claimed in claim 1 wherein the step of electronically inserting said dynamic input test signal into said source image comprises supplying said source image to an insertion circuit that precedes said processing circuit, and generating said dynamic input test signal in said insertion circuit and electronically inserting said dynamic input test signal into said source image in said insertion circuit.

3. A method as claimed in claim 1 wherein the step of electronically inserting said dynamic input test signal into said source image comprises supplying said source image to an insertion circuit that precedes said processing circuit, supplying said dynamic input test signal to said insertion circuit, and electronically inserting said dynamic input test signal into said source image in said insertion circuit.

4. A method as claimed in claim 1 wherein said source image has an image edge, and comprising electronically inserting said dynamic input test signal into said source image at said image edge.

5. A method as claimed in claim 1 comprising generating said source image as an x-ray image.

6. A method as claimed in claim 1 wherein the step of generating a humanly perceptible notification comprises discontinuing display of said output image.

7. A method as claimed in claim 6 comprising, if display of said output image is discontinued, displaying said source image in place thereof.

8. A method as claimed in claim 1 wherein the step of generating a humanly perceptible notification comprises generating and displaying a predetermined message.

9. A method as claimed in claim 1 comprising:
   electronically inserting said dynamic input test signal into said input image in an insertion circuit;
   testing said output image from said processing circuit in a test circuit, and monitoring operation of said insertion circuit with said test circuit and generating a warning from said test circuit if erroneous operation of said insertion circuit is detected; and
   monitoring operation of said test circuit with said insertion circuit and generating a warning from said insertion circuit if erroneous operation of said test circuit is detected.

10. A method as claimed in claim 9 comprising:
    if said test circuit detects erroneous operation of said insertion circuit, taking over electronic insertion of said dynamic input test signal into said source image in said test circuit; and
    if said insertion circuit detects erroneous operation of said test circuit, taking over testing of said output signal from said processing circuit in said insertion circuit.

11. A method as claimed in claim 1 comprising, in said processing circuit, generating said output image by subtracting a reference image from said cached image.

12. An apparatus for monitoring electronic transmission of an image comprising:
    an insertion circuit that electronically inserts a dynamic input test signal into an electronic source image to produce an electronic input image;
    a processing circuit connected to said insertion circuit and being supplied with said input image, said processing circuit having an image memory and said processing circuit caching said input image in said image memory, as a cached image;
    said processing circuit generating an output image containing a dynamic output test signal, said output image being selected from the group consisting of said cached image and an image derived from said cached image, and emitting said output image;
    a display connected to said processing circuit for displaying said output image; and
    a test circuit connected to said processing circuit and also supplied with said output image that tests only said dynamic output test signal in said output image to detect whether said dynamic output test signal corresponds to said dynamic input test signal, and said test circuit generating a humanly perceptible notification if said dynamic output test signal does not correspond to said dynamic input test signal.

13. An apparatus as claimed in claim 12 wherein said insertion circuit generates said dynamic input test signal.

14. An apparatus as claimed in claim 12 wherein said dynamic input test signal is externally supplied to said insertion circuit.

15. An apparatus as claimed in claim 12 wherein said source image has an image edge, and wherein said insertion circuit inserts said dynamic input test signal into said source image at said image edge.

16. An apparatus as claimed in claim 12 wherein, as said humanly perceptible notification, said test circuit discontinues display of said output image at said display.

17. An apparatus as claimed in claim 16 wherein said processing circuit, if display of said output image is discontinued by said test circuit, displays said source image at said display in place thereof.

18. An apparatus as claimed in claim 12 wherein said test circuit, as said humanly perceptible notification, generates a predetermined message at said display.

19. An apparatus as claimed in claim 12 wherein said test circuit monitors operation of said insertion circuit and generates a warning if erroneous operation of said insertion circuit is detected, and wherein said insertion circuit monitors operation of said test circuit and generates a warning if erroneous operation of said test circuit is detected.

20. An apparatus as claimed in claim 19 wherein:
if said test circuit detects erroneous operation of said insertion circuit, said test circuit takes over electronic insertion of said dynamic input test signal into said source image in said test circuit; and
if said insertion circuit detects erroneous operation of said test circuit, said insertion circuit takes over testing of said output signal from said processing circuit in said insertion circuit.

21. An apparatus as claimed in claim 12 wherein said processing circuit, generates said output image by subtracting a reference image from said cached image.

22. A computer readable medium encoded with programming instructions that operate an insertion circuit, a processing circuit and a test circuit for monitoring electronic transmission of an image, said programming instructions:
causing a dynamic input test signal to be electronically inserted, in said insertion circuit, into an electronic source image to produce an electronic input image;
causing said input image to be supplied from said insertion circuit to a processing circuit and, in said processing circuit, to be cached in an image memory, as a cached image;
causing said processing circuit to generate an output image containing a dynamic output test signal, said output image being selected from the group consisting of said cached image and an image derived from said cached image, and to emit said output image from said processing circuit and to display said output image;
causing only said dynamic output test signal in said output image emitted from said processing circuit to be tested in said test circuit as to whether said dynamic output test signal corresponds to said dynamic input test signal; and
causing said test circuit to generate a humanly perceptible notification if said dynamic output test signal does not correspond to said dynamic input test signal.

23. A computer-readable medium as claimed in claim 22 wherein said programming instructions cause said dynamic input test signal to be generated in said insertion circuit.

24. A computer-readable medium as claimed in claim 22 wherein said programming instructions cause said insertion circuit to receive said dynamic input test signal from an external source.

25. A computer-readable medium as claimed in claim 22 wherein said source image has an image edge, and wherein said programming instructions cause said dynamic input test signal to be electronically inserted into said source image at said image edge.

26. A computer-readable medium as claimed in claim 22 wherein said programming instructions cause display of said output image to be discontinued, as said humanly perceptible notification.

27. A computer-readable medium as claimed in claim 26 wherein, if display of said output image is discontinued, said wherein said programming instructions cause said source image to be displayed in place thereof.

28. A computer-readable medium as claimed in claim 22 wherein said programming instructions cause generation and display of a predetermined message as said humanly perceptible notification.

29. A computer-readable medium as claimed in claim 22 wherein said programming instructions cause said test circuit to monitor operation of said insertion circuit and to generate a warning from said test circuit if erroneous operation of said insertion circuit is detected, and cause said insertion circuit to monitor operation of said test circuit and to generate a warning from said insertion circuit if erroneous operation of said test circuit is detected.

30. A computer-readable medium as claimed in claim 29 wherein:
if said test circuit detects erroneous operation of said insertion circuit, said said programming instructions cause said test circuit to take over electronic insertion of said dynamic input test signal into said source image in said test circuit; and
if said insertion circuit detects erroneous operation of said test circuit, said programming instructions cause said insertion circuit to take over testing of said output signal from said processing circuit in said insertion circuit.

31. A computer-readable medium as claimed in claim 22 wherein said programming instructions cause said processing circuit to generate said output image by subtracting a reference image from said cached image.

32. A method as claimed in claim 1 wherein the step of testing only said dynamic output test signal comprises extracting said dynamic output test signal from said output image.

33. An apparatus as claimed in claim 12 wherein said test circuit tests only said dynamic output test signal by extracting said dynamic output test signal from said output image.

34. A computer-readable medium as claimed in claim 22 wherein said programming instructions cause only said dynamic output test signal to be tested by causing said dynamic output test signal to be extracted from said output image.

* * * * *